(12) United States Patent
Jeong et al.

(10) Patent No.: US 10,375,021 B2
(45) Date of Patent: Aug. 6, 2019

(54) METHOD AND APPARATUS FOR PROCESSING REQUEST FOR STOPPING NOTIFICATION RECEIPT IN WIRELESS COMMUNICATION SYSTEM

(71) Applicant: LG ELECTRONICS INC., Seoul (KR)

(72) Inventors: Seungmyeong Jeong, Seoul (KR); Seongyun Kim, Seoul (KR); Hongbeom Ahn, Seoul (KR); Dongjoo Kim, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/549,322

(22) PCT Filed: Jan. 15, 2016

(86) PCT No.: PCT/KR2016/000457
§ 371 (c)(1),
(2) Date: Aug. 7, 2017

(87) PCT Pub. No.: WO2016/126021
PCT Pub. Date: Aug. 11, 2016

(65) Prior Publication Data
US 2018/0034777 A1   Feb. 1, 2018

Related U.S. Application Data

(60) Provisional application No. 62/112,660, filed on Feb. 6, 2015, provisional application No. 62/131,840, filed on (Continued)

(51) Int. Cl.
*H04L 29/06* (2006.01)
*H04W 4/60* (2018.01)
(Continued)

(52) U.S. Cl.
CPC ...... *H04L 63/0245* (2013.01); *H04L 63/0227* (2013.01); *H04L 63/0236* (2013.01); (Continued)

(58) Field of Classification Search
CPC ..... H04L 63/02; H04L 67/26; H04L 63/0227; H04L 63/0236; H04L 63/0245;
(Continued)

(56) References Cited

U.S. PATENT DOCUMENTS 8,135,124 B2 * 3/2012 Ramanathan ..... H04M 3/42042
379/211.01
2014/0237055 A1 * 8/2014 Burrell ..... H04L 51/28
709/206

(Continued)

FOREIGN PATENT DOCUMENTS

KR   10-2013-0114664 A   10/2013
KR   10-2014-0103658 A   8/2014
(Continued)

*Primary Examiner* — Magdi Elhag
(74) *Attorney, Agent, or Firm* — Birch, Stewart, Kolasch & Birch, LLP

(57) ABSTRACT

A method for processing a request for stopping the receipt of notifications according to a notification subscription in a wireless communication system, according to an embodiment of the present invention may comprise the steps of: a first device, by which the method is performed, receiving from a second device a request for stopping the receipt of notifications according to a notification subscription; selecting a policy to process the request; and processing the request according to action information of the selected policy.

10 Claims, 15 Drawing Sheets

Related U.S. Application Data on Mar. 12, 2015, provisional application No. 62/150,304, filed on Apr. 21, 2015, provisional application No. 62/158,497, filed on May 7, 2015.

(51) Int. Cl.
*H04W 4/00* (2018.01)
*H04W 68/00* (2009.01)
*H04W 4/70* (2018.01)
*H04L 29/08* (2006.01)

(52) U.S. Cl.
CPC ............... *H04L 67/26* (2013.01); *H04W 4/00* (2013.01); *H04W 4/60* (2018.02); *H04W 4/70* (2018.02); *H04W 68/00* (2013.01); *H04W 68/005* (2013.01)

(58) Field of Classification Search
CPC ........... H04L 63/0254; H04L 63/0263; H04W 4/005; H04W 68/005; H04W 4/60; H04W 4/70; H04W 68/00
See application file for complete search history.

(56) References Cited

U.S. PATENT DOCUMENTS

| 2015/0019686 A1* | 1/2015 | Backholm ............... H04L 47/32 709/217 |
| 2016/0007138 A1* | 1/2016 | Palanisamy ........... H04W 4/005 455/41.2 |
| 2017/0048646 A1* | 2/2017 | Foti ......................... H04W 4/70 |

FOREIGN PATENT DOCUMENTS

| WO | WO 2014/117039 A1 | 7/2014 |
| WO | WO 2014/129802 A1 | 8/2014 |

\* cited by examiner (a) <AE> registration (b) <CSE> registration

METHOD AND APPARATUS FOR PROCESSING REQUEST FOR STOPPING NOTIFICATION RECEIPT IN WIRELESS COMMUNICATION SYSTEM

CROSS REFERENCE TO RELATED APPLICATIONS

This application is the National Phase of PCT International Application No. PCT/KR2016/000457, filed on Jan. 15, 2016, which claims priority under 35 U.S.C. 119(e) to U.S. Provisional Application No. 62/112,660, filed on Feb. 6, 2015, No. 62/131,840, filed on Mar. 12, 2015, No. 62/150,304, filed on Apr. 21, 2015, and No. 62/158,497, filed on May 7, 2015, all of which are hereby expressly incorporated by reference into the present application.

TECHNICAL FIELD

The present invention relates to a method and apparatus for processing a notification reception stop request in a wireless communication system.

BACKGROUND ART

As the ubiquitous era is entered, M2M (machine to machine) communication technology is in the limelight. M2M communication technology is being studied by many standard development organizations (SDO) such as TIA, ATIS, ETSI, one M2M and the like.

M2M communication system may have resource oriented architecture (ROA) and an access to various resources may be efficient. The access may be provided for the same operation (e.g., write, read, delete, execute, etc.) for the various resources.

When a subscription/notification function is used in an ROA based M2M system, an entity having created a subscription may differ from an entity actually receiving a notification. If the notification receiving entity does not want a notification message reception anymore, an effective method for handling the same is required. The present invention proposes a method of delegating notification rejection authority and solves an access authority problem and a problem that a message size for notification rejection increases.

DISCLOSURE OF THE INVENTION

Technical Task

The present invention intends to propose a method for processing a request for stopping a notification reception according to a notification subscription.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of processing a reception stop request of a notification according to a notification subscription in a wireless communication system, the method performed by a first device, the method including receiving a request for stopping a reception of the notification from a second device according to the notification subscription, selecting a policy for processing the request, and processing the request according to action information of the selected policy, wherein the policy selecting comprises checking whether a policy for target removal for the second device is set and selecting the policy for the target removal for the second device when the policy for the target removal for the second device is set, wherein when the policy for target removal for the second device is not set, the policy selecting comprises checking whether a default policy set by a creator device of the notification subscription exists and selecting the default policy set by the creator device when the default policy set by the creator device of the notification subscription exists, or wherein when the default policy set by the creator device of the notification subscription does not exist, the policy selecting comprises selecting a default policy set by a service provider.

Additionally or alternatively, the method may further include determining whether the second device is included in targets of the notification subscription service.

Additionally or alternatively, the action information may indicate one of: a) accept the request; b) reject the request; c) ask the creator device of the notification subscription whether to accept the request; and d) inform the creator device of the notification subscription.

Additionally or alternatively, the checking whether the policy for the target removal for the second device is set may include referring to a specific resource including URI (uniform resource identifier) of the second device and a policy resource linked to the specific resource.

Additionally or alternatively, the policy indicated by the linked policy resource may be selected as the policy for the target removal for the second device.

Additionally or alternatively, the selecting the default policy set by the creator device may include when a specific policy resource includes information indicating 'default' and 'creator' attribute of the specific policy resource includes information on the creator device of the notification subscription, selecting a policy indicated by the specific policy resource as the default policy set by the creator device of the notification subscription.

Additionally or alternatively, the selecting the default policy set by the service provider may include when a specific policy resource includes information indicating 'default', selecting the specific policy resource as the default policy set by the service provider.

In another technical aspect of the present invention, provided herein is an apparatus for processing a stop request of a reception of a notification according to a notification subscription in a wireless communication system, the apparatus including a radio frequency (RF) unit and a processor controls the RF unit, wherein the processor receives a request for stopping a reception of the notification from a second device according to the notification subscription, select a policy for processing the request, and process the request according to action information of the selected policy, wherein in selecting the policy, the processor further checks whether a policy for target removal for the second device is set and select the policy for the target removal for the second device when the policy for the target removal for the second device is set, wherein when the policy for target removal for the second device is not set, the processor further checks whether a default policy set by a creator device of the notification subscription exists and select the default policy set by the creator device when the default policy set by the creator device of the notification subscription exists, or wherein when the default policy set by the creator device of the notification subscription does not exist, the processor selects a default policy set by a service provider.

Additionally or alternatively, the processor may determines whether the second device is included in targets of the notification subscription service.

Additionally or alternatively, the action information may indicate one of: a) accept the request; b) reject the request; c) ask the creator device of the notification subscription whether to accept the request; and d) inform the creator device of the notification subscription.

Additionally or alternatively, in checking whether the policy for the target removal for the second device is set, the processor may refers to a specific resource including URI (uniform resource identifier) of the second device and a policy resource linked to the specific resource.

Additionally or alternatively, the policy indicated by the linked policy resource may be selected as the policy for the target removal for the second device.

Additionally or alternatively, in selecting the default policy set by the creator device, when a specific policy resource includes information indicating 'default' and 'creator' attribute of the specific policy resource includes information on the creator device of the notification subscription, the processor may selects a policy indicated by the specific policy resource as the default policy set by the creation device of the notification subscription.

Additionally or alternatively, in selecting the default policy set by the service provider, when a specific policy resource includes information indicating 'default', the processor may select the specific policy resource as the default policy set by the service provider.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, a request for stopping a notification service can be efficiently processed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
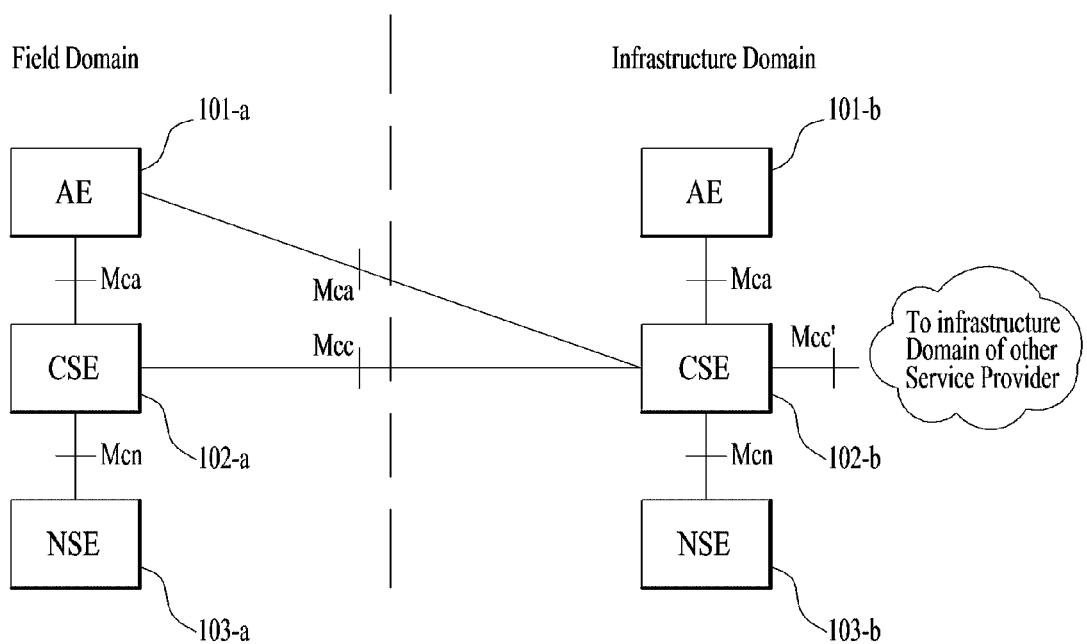
FIG. 1 shows a functional structure in an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
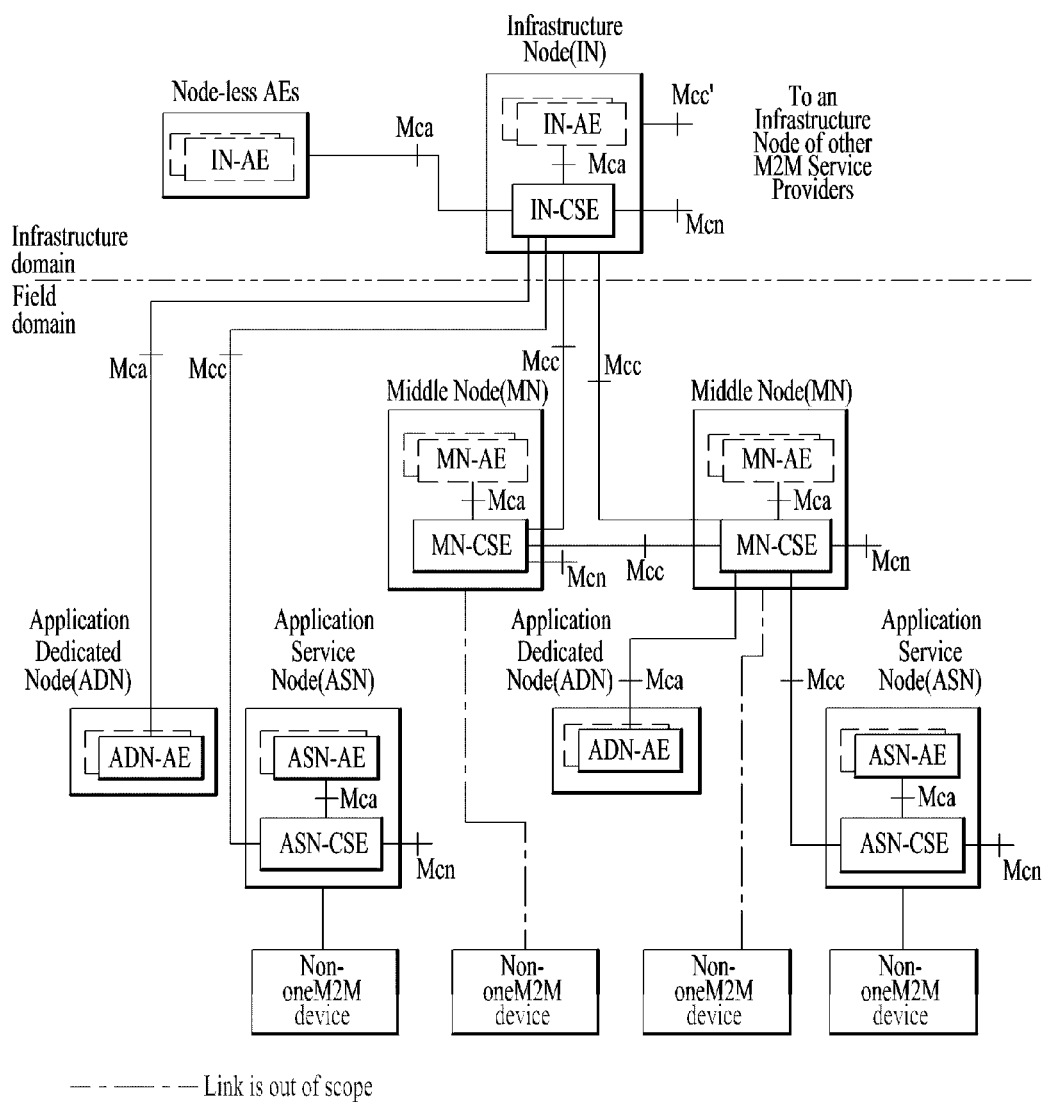
FIG. 2 shows a configuration supported by an M2M communication system based on an M2M function structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;

one or more middle nodes (MNs); and one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
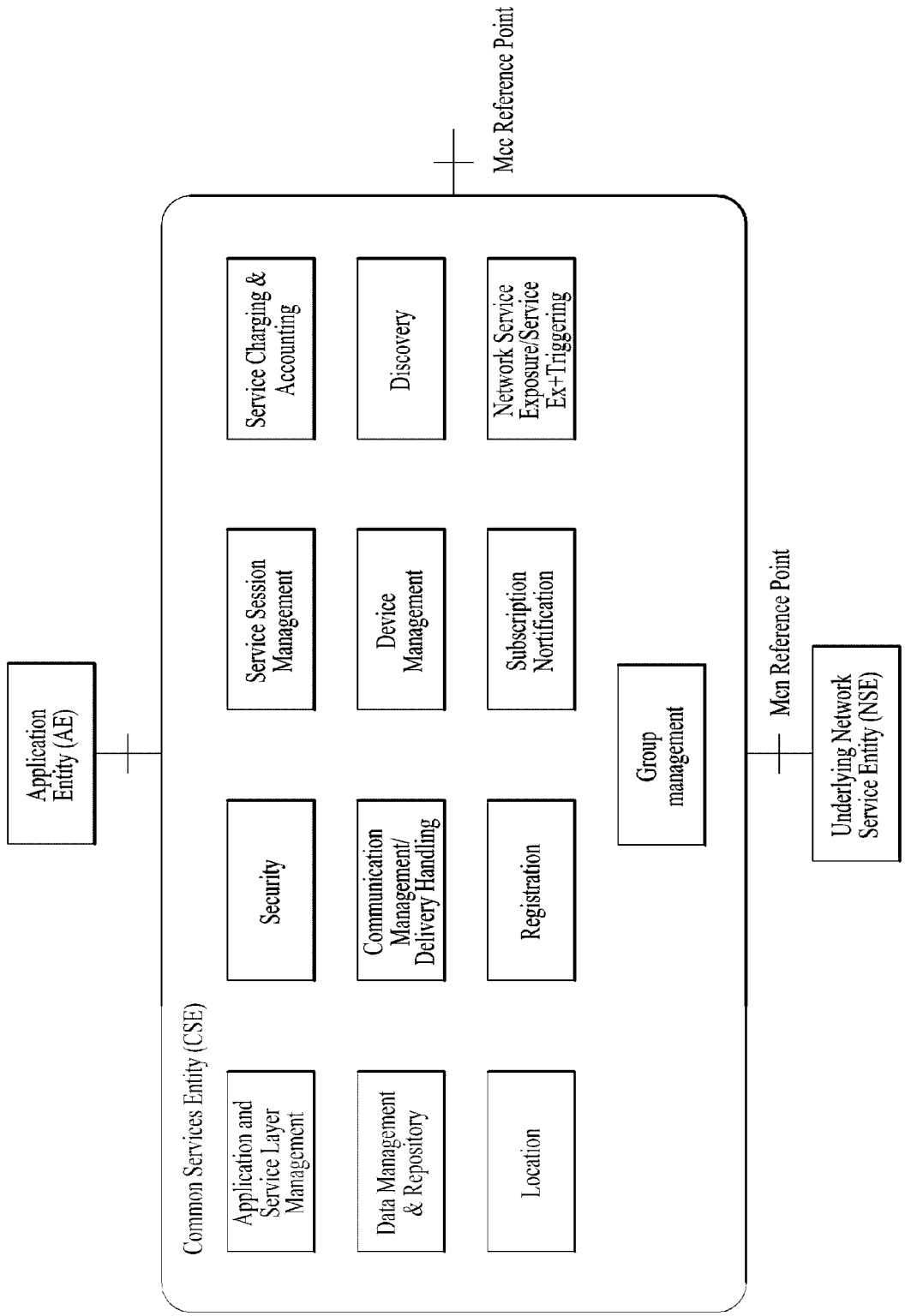
FIG. 3 shows a common service function provided by an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
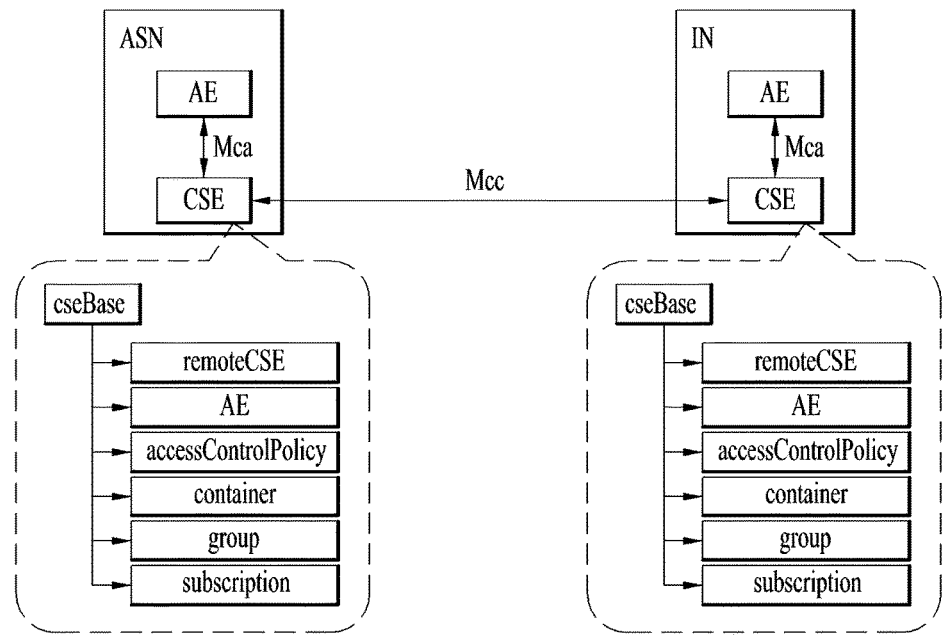
FIG. 4 shows resource structures existing at an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
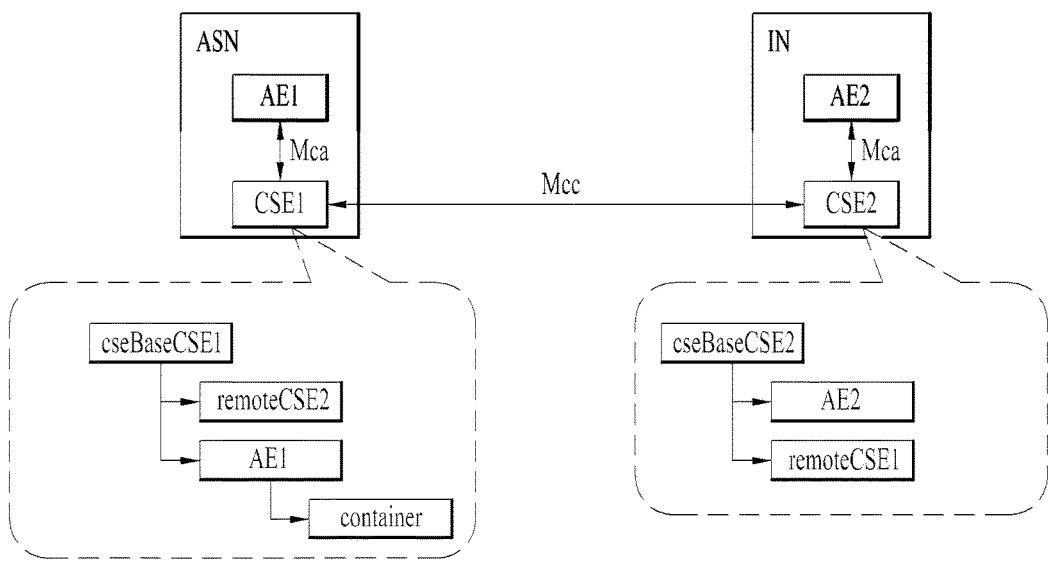
FIG. 5 shows a resource structure existing at an M2M application service node (e.g., M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
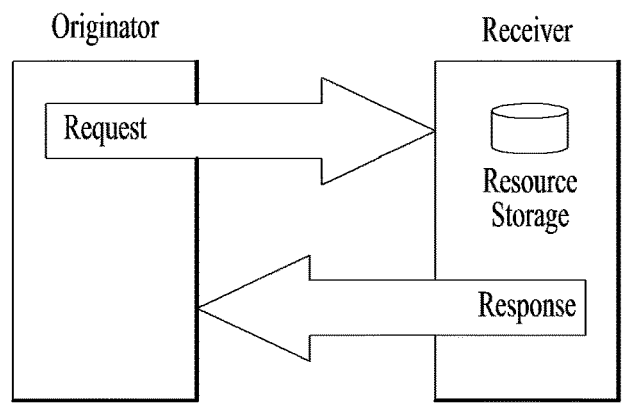
FIG. 6 shows a procedure for exchanging request and response messages used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

Operation: "Operation" means the shape of an operation to be carried out. (This information may be selected from among Create, Retrieve, Update, Delete, and Notify.)

To: "To" means an ID (i.e., ID of the receiver) of an entity scheduled to receive the request.

From: "From" means an ID of a calling user (i.e., call originator) who generates the request.

Request Identifier: "Request Identifier" means an ID (i.e., ID used to discriminate the request message) of the request message Group Request Identifier parameter (identifier to prevent group fan-out request messages from being repeated)

Content: "Content" means content of resources to be transmitted.

The response message may include the following information. If the corresponding request message is successfully processed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message used to identify the ID of the request message.

Result contents: "Result contents" means the processed result (for example, Okay, Okay and Done, Okay and in progress) of the request message.

Content: "Content" means content of resources to be transmitted (only the resultant value (rs) can be transmitted.)

If the request message processing is failed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message (so as to identify the ID of the request message).

rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
| --- | --- | --- | --- |
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |

TABLE 1-continued

| Resource Type | Short Description | Child Resource Types | Parent Resource Types |
|---|---|---|---|
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node schedule | CSEBase |
| subscription | Subscription resource represents the subscription information related to a resource. Such a resource shall be a child resource for the subscribe-to resource. | | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |

TABLE 2-continued

| Attributes of <container> | Multiplicity | RW/RO/WO | Description |
|---|---|---|---|
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parent ID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource ". . .//example.com/oneM2M/myCSE", the value of the parentID attribute will contain ". . .//parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |

TABLE 2-continued

| Attributes of <container> | Multiplicity | RW/RO/WO | Description |
|---|---|---|---|
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent resource should be incremented first and copied into this stateTag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A URI of the ontology used to represent the information that is managed and understood by the AE. |

TABLE 2-continued

| Attributes of <container> | Multiplicity | RW/RO/WO | Description |
|---|---|---|---|
| | | | The ontology refers to a specification in which terms and relationship therebetween used in a domain to be handled. |

Resource Access Control Policy

An access control policy is defined as a "white list" or privileges and each privilege defines "allowed" entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
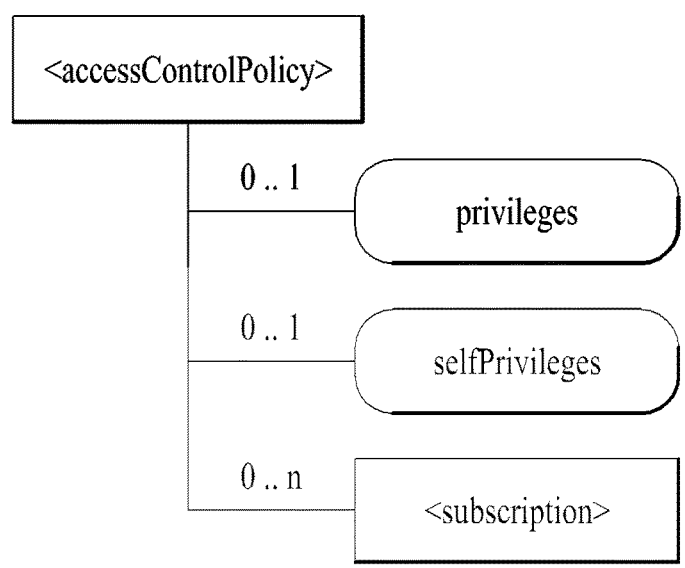
FIG. 7 shows a structure of <accessControlPolicy> resource.

FIG. 7 illustrates a structure of the <accessControlPolicy> resource. The following table shows attributes of the <accessControlPolicy> resource.

TABLE 3

| Attribute Name of <accessControlPolicy> | Multiplicity | RW/RO/WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (URI) to the original resource. This is only for <accessControlPolicyAnnc>. |
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| privileges (ps) | 1 | RW | The list of privileges defined by this <accessControlPolicy> resource. These privileges are applied to resources referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 4

| Name | Description |
| --- | --- |
| originatorPrivileges | Refer to Table 5 |
| Contexts | Refer to Table 6 |
| operationFlags | Refer to Table 7 |

"originatorPrivileges" includes information shown in the following table.

TABLE 5

| Name | Description |
| --- | --- |
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 4 includes information shown in the following table.

TABLE 6

| Name | Description |
| --- | --- |
| Context | Defines the context in which every privileges of the present access control policy resource applies, e.g. time windows, location, and IP address. |

"operationFlags" in Table 4 includes information shown in the following table.

TABLE 7

| Name | Description |
| --- | --- |
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource. Accordingly, if an M2M entity wants to check an access control policy of a specific resource, the M2M entity needs to refer to AccessRightID.

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 8:
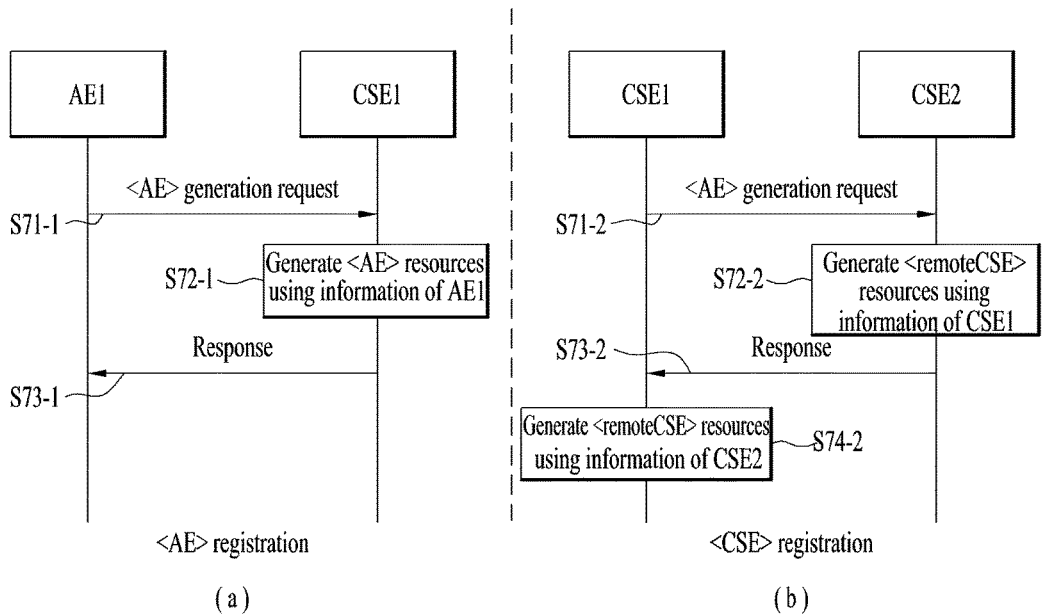
FIG. 8 shows a registration procedure in an M2M communication system.

FIG. 8 illustrates an AE registration procedure and a CSE registration procedure. FIG. 8(a) shows the AE registration procedure. AE1 that intends to perform registration sends a request for generation of <AE> resources to CSE1 corresponding to a registrar (S81-1). CSE1 can generate the <AE> resources using information of AE1 (S82-2). Then, CSE1 can send a response including a result of registration to AE1 (S83-2).

FIG. 8(b) illustrates the CSE registration procedure. The procedure of FIG. 8(b) corresponds to the procedure of FIG. 8(a) except that CSE1 corresponds to a registree, CSE2 corresponds to a registrar, and when CSE2 sends a result for a registration request of CSE1 (S83-2), CSE1 generates <remoteCSE> resources using information of CSE2 (S84-2).

Subscription Resource Type

The <subscription> resource contains subscription information for its subscribed-to resource. The <subscription> resource is a child of the subscribed-to resource. Hence, the <subscription> resource shall be represented as child resource of the subscribed-to resource. For example, <container> resource has <subscription> resource as a child resource. A <subscription> resource shall be deleted when the parent subscribed-to resource is deleted.

The <subscription> resource shall represent a subscription to a subscribed-to resource. An Originator shall be able to create a resource of <subscription> resource type when the Originator has RETRIEVE privilege to the subscribe-to resource. The Originator which creates a <subscription> resource becomes the resource subscriber.

Each <subscription> resource may include notification policies that specify which, when, and how notifications are sent. These notification policies may work in conjunction with CMDH policies.

When a <subscription> resource is deleted, a Notify request shall be sent to the subscriber URI if it is provided by the Originator.

The <subscription> resource has a child resource, and its name is notificationSchedule that is <schedule> resource type. In the context of the <subscription> resource, the notificationSchedule specifies when notifications may be sent by the Hosting CSE to the notificationURI(s).

The attributes specified to the <subscription> resource are shown as follows. The attributes in the following table lists partial attributes of the <subscription> resource only.

TABLE 8

| Attributes of <subscription> | Multiplicity | RW/RO/WO | Description |
| --- | --- | --- | --- |
| accessControlPolicyIDs | 0 . . . 1(L) | RW | See Table 2. If no accessControlPolicyIDs is given at the time of creation, the accesControlPolicies of the parent resource is linked to this attribute. |

TABLE 8-continued

| Attributes of <subscription> | Multiplicity | RW/RO/WO | Description |
| --- | --- | --- | --- |
| eventNotificationCriteria | 0 . . . 1(L) | RW | This notification policy indicates the event criteria for which a notification is to be generated. |
| expirationCounter | 0 . . . 1 | RW | This notification policy indicates that the subscriber wants to set the life of this subscription to a limit of a maximum number of notifications. When the number of notifications sent reaches the count of this counter, the <subscription> resource shall be deleted, regardless of any other policy. |
| notificationURI | 1(L) | RW | List of URI(s) where the resource subscriber will receive notifications. This list of URI(s) may not represent the resource subscriber entity. For a group-related subscription, the notificationURI shall be the URI that is generated by the group Hosting CSE to receive notifications. In this case, the resource subscriber notification URI shall be included in the notificationForwardingURI. |
| gourpName | 0 . . . 1 | RW | The URI of a <group> resource in case the subscription is made through a group. |
| notificationForwardingURI | 0 . . . 1 | RW | The attribute is a forwarding attribute that shall be present only for group related subscriptions. It represents the resource subscriber notification URI. It shall be used by group Hosting CSE for forwarding aggregated notifications. |
| batchNotify | 0 . . . 1 | RW | This notification policy indicates that the subscriber wants to receive batches of notifications rather than receiving them one at a time. This attribute expresses the subscriber's notification policy and may include two values: the number of notifications to be batched for delivery and a duration. When either value is set, notification events are temporarily stored until either the specified number of notifications have been batched, or, until a duration which starts after the first notification was generated has expired. Following which the batched notifications are sent. If batchNotify is used simultaneously with latestNotify, only the latest notification shall be sent and have the ec set to "latest". |
| rateLimit | 0 . . . 1 | RW | This notification policy indicates that the subscriber wants to limit the rate at which it receives notifications. This attribute expresses the subscriber's notification policy and includes two values: a maximum number of events that may be sent within some duration, and the rateLimit window duration. When the number of generated notifications within the ratelimit window duration exceeds the maximum number, notification events are temporarily stored, until the end of the window duration, when the sending of notification events restarts in the next window duration. The sending of notification events continues as long as the maximum number of notification events is not exceeded during the window duration. The ratelimit policy may be used simultaneously with other notification policies. |
| preSubscriptionNotify | 0 . . . 1 | WO | This notification policy indicates that the subscriber wants to be sent notifications for events that were generated prior to the creation of this subscription. This attribute has a value of the number of prior notification events requested. If up-to-date caching of retained events is supported on the Hosting CSE and contains the subscribed events then prior notification events will be sent up to the number requested. The preSubscriptionNotify policy may be used simultaneously with any other notification policy.) |
| pendingNotification | 0 . . . 1 | RW | This notification policy, if set, indicates how missed notifications due to a period of connectivity (according to the reachability and notification schedules). The possible values for pendingNotification are:<br>"sendLatest"<br>"sendAllPending" |

TABLE 8-continued

| Attributes of <subscription> | Multiplicity | RW/RO/WO | Description |
|---|---|---|---|
| | | | This policy depends upon caching of retained notifications on the hosted CSE. When this attribute is set, only the last notification shall be sent and it shall have the ec set to "latest". If this attribute is not present, the Hosting CSE sends no missed notifications. This policy applies to all notifications regardless of the selected delivery policy (batching, latestNotification, etc..) Note that unreachability due to reasons other than scheduling is not covered by this policy. |
| notificationStoragePriority | 0 . . . 1 | RW | Indicates that the subscriber wants to set a priority for this subscription relative to other subscriptions belonging to this same subscriber. This attribute sets a number within the priority range. When storage of notifications exceeds the allocated size, this policy is used as an input with the storage congestion policy to determine which stored and generated notifications to drop and which ones to retain. |
| latestNotify | 0 . . . 1 | RW | This notification policy indicates if the subscriber wants only the latest notification. If multiple notifications of this subscription are buffered, and if the value of this attribute is set to true, then only the last notification shall be sent and it shall have the ec value set to "latest".) |
| notificationContentType | 1 | RW | Indicates a notification content type that shall be contained in notifications. The allowed values are:. modified attributes only whole resource optionally the reference to this subscription resource.) |
| notificationEventCat | 0 . . . 1 | RW | This notification policy indicates the subscriber's requested ec to be used for notification messages generated by this subscription. |
| creator | 0 . . . 1 | WO | AE-ID or CSE-ID which created the <subscription> resource. |
| subscriberURI | 0 . . . 1 | WO | URI that is sent a notification when this <subscription> is deleted.) |

The eventNotificationCriteria conditions are shown as follows.

TABLE 9

| Condition tag | Multiplicity | Matching condition |
|---|---|---|
| createBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| stateTagSmaller | 0 . . . 1 | The stateTag attribute of the resource is smaller than the specified value. |
| stateTagBigger | 0 . . . 1 | The stateTag attribute of the resource is bigger than the specified value. |
| expireBefore | 0 . . . 1 | The expirationTime attribute of the resource is chronologically before the specified value. |
| expireAfter | 0 . . . 1 | The expirationTime attribute of the resource is chronologically after the specified value. |
| sizeAbove | 0 . . . 1 | The contentSize attribute of the <contentInstance> resource is equal to or greater than the specified value. |
| sizeBelow | 0 . . . 1 | The contentSize attribute of the <contentInstance> resource is smaller than the specified value. |
| resourceStatus | 0 . . . n | When the subscribed-to resource is changed by the operations or expiration, the resource status is the same as the specified value. Possible values are: child created, updated, child deleted, deleted. If child created or child deleted is configured, other eventNotificationCriteria conditions shall be applied to the created or deleted child resource. Notification contains the contents for a created child resource or deleted child resource based on value of |

TABLE 9-continued

| Condition tag | Multiplicity | Matching condition |
|---|---|---|
| | | notificationContentType attribute. If this condition is not specified, the default value is updated. |
| operationMonitor | 0 . . . n | The operations accessing the subscribed-to resource matches with the specified value. It allows monitoring which operation is attempted to the subscribed-to resource regardless of whether the operation is performed. This feature is useful when to find malicious AEs. Possible string arguments are: create, retrieve, update, delete. |
| attribute | 0 . . . n | This is an attribute name of resource types. E.g. creator of container resource type can be used as "creator = Sam". When multiple attributes are set then the result is based upon the AND of all attributes. |

M2M common service layer provides subscription/notification function to application. This enables data to be exchanged between CSE and AE through storages of different CSEs. Subscription/Notification basically operates as shown in FIG. 9.

Entity 2 intends to receive information on a specific event (e.g., resource value change of Entity 1) of Entity. To this end, Entity 2 creates or sets a subscription to the specific event for Entity 1 [S910] and may then receive a response to it [S920]. As the specific event occurs, if a notification according to the subscription is triggered, Entity 1 may notify it to Entity 2 [S930].

Figure 9:
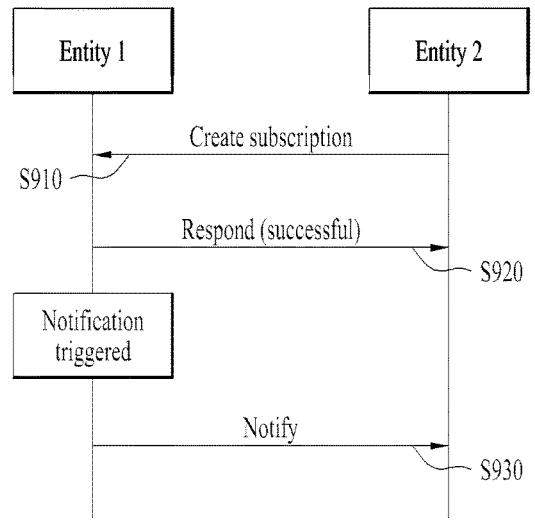
FIG. 9 shows an operation related to a subscription service.
Figure 10:
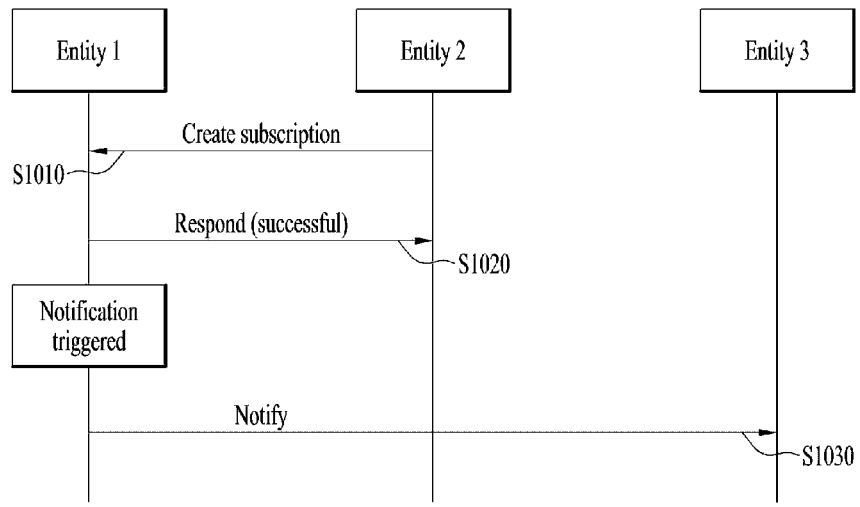
FIG. 10 shows an operation related to a subscription service.

FIG. 10 shows a case that 3 entities are involved in subscription/notification. It is not always necessary for Entity 2 to receive a notification of a subscription created by Entity 2. A case that a single entity creates a subscription for a multitude of other entities in M2M environment may be taken as an example. Hence, in the following environment, an entity having created a subscription may differ from an entity actually receiving a notification. Namely, unlike FIG. 9, although Entity 2 has created or set the subscription [S1010], the notification according to the subscription may be delivered to Entity 3 [S1030].

The subscription set or created in FIG. 9 or FIG. 10 is created or set for Entity 1 in form of the above described subscription resource (<subscription>).

Figure 11:
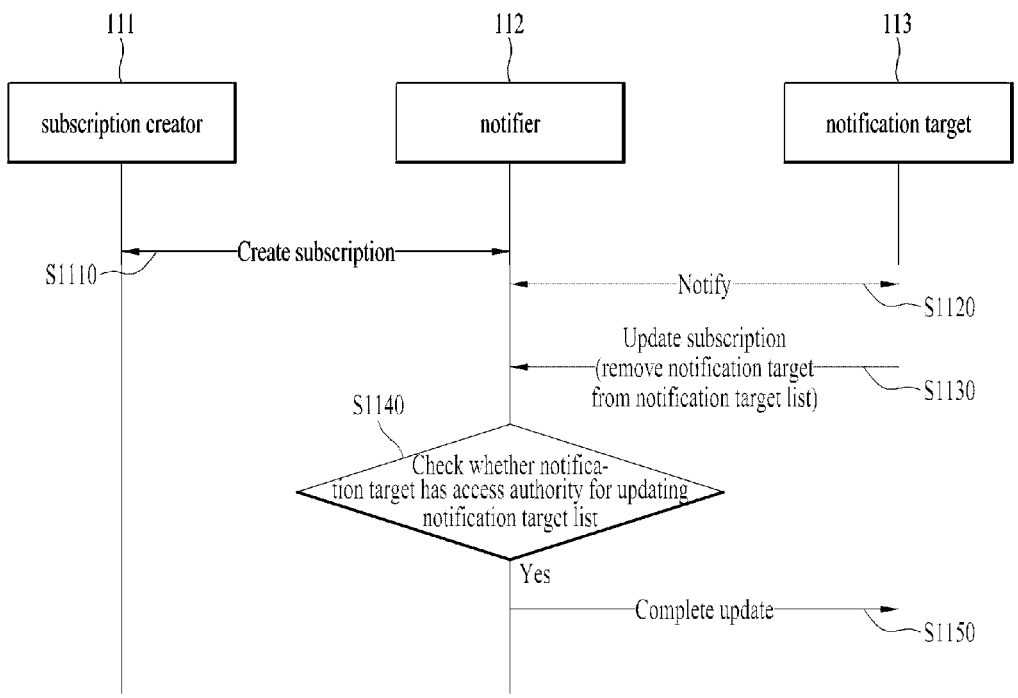
FIG. 11 shows an operation for updating a notification target list.

According to a related art, like FIG. 11, in order for a specific notification target to reject a further notification reception, the specific notification target should update notification target information (i.e., notificationURI attribute of <subscription> resource) of a corresponding subscription resource. To this end, it is a problem that a corresponding entity (e.g., notification target 113 in FIG. 11) should have access authority for updating the corresponding subscription resource. Since the corresponding authority means that all other attributes of the subscription resource can be changed, an entity (e.g., subscription creator 111 in FIG. 11) having created the subscription may have the corresponding authority in general.

In the present specification, the subscription creator means an entity creating a subscription resource for a notifier, the notifier means an entity sending a notification to a notification target according to the created subscription resource, and the notification target means an entity receiving the notification.

Moreover, if multiple notification targets exist, there is a problem that a subscription update message corresponding to S1130 may become very large. For instance, in case of a subscription for which 100 targets are set, if a specific target intends to remove itself, the notification target 113 should update the subscription resource by containing 99 target informations except the specific target. Of course, to this end, the notification target 113 should know the rest of 99 target informations by retrieving the corresponding subscription resource in advance.

Figure 12:
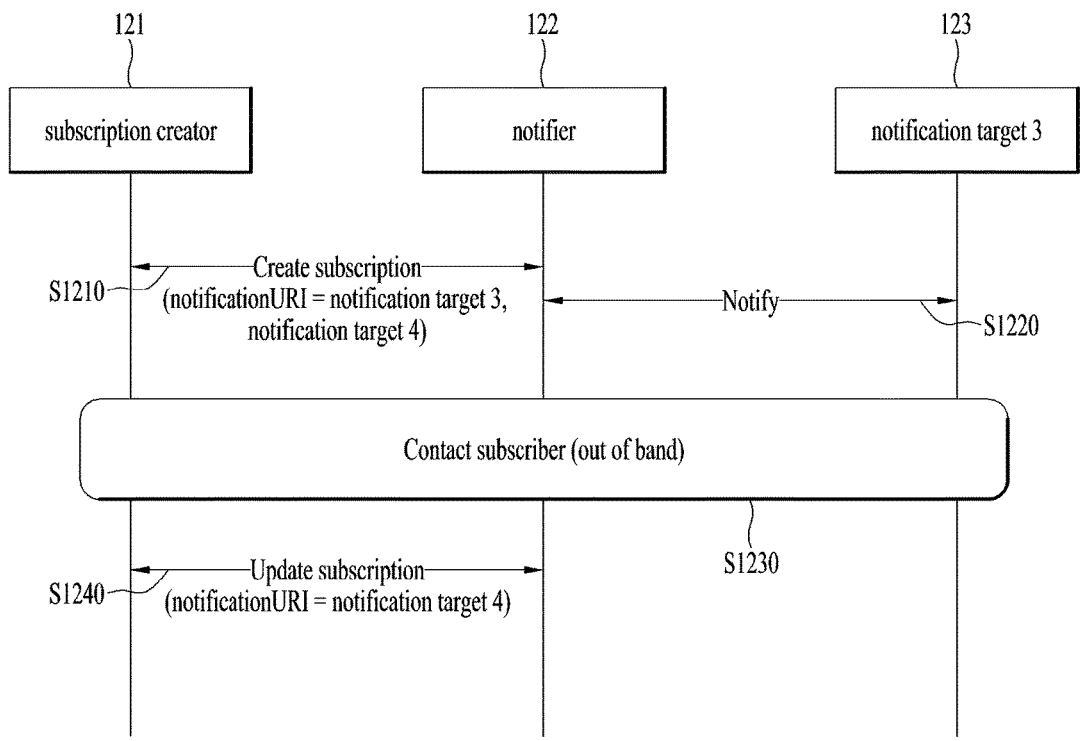
FIG. 12 shows an operation for updating a notification target list.

As another method, like FIG. 12, there is a method of enabling a subscription creator to update the corresponding subscription [S1240] in a manner that a notification target delivers a notification update message to the subscription creator. Yet, in a related art system following RESTful, subscription information is stored in a subscription host and a protocol for enabling a notification target to send a subscription creator a request for updating the corresponding subscription information cannot be defined. Hence, the notification target should make such a request through another method other than the related art system.

Figure 13:
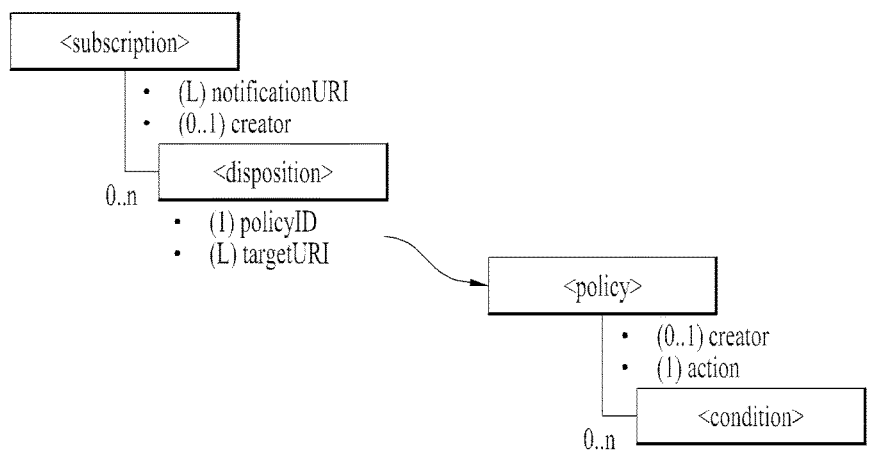
FIG. 13 shows a structure of a subscription resource according to one embodiment of the present invention.

Hereinafter, a scheme for a notification target to request a subscription update will be described, Policy for Notification Target Removal A subscription creator can set up a target removal policy in advance in order for a notifier to process a target removal request made by a specific notification target itself in the course of subscription configuration (creation/modification). This policy may include target information (e.g., target ID/URI), removal request processing method (e.g., Reject, Remove, Notify to Subscription Creator) and a removal condition (e.g., time/location). As shown in FIG. 13, the target information may be saved to <disposition> resource, the policy/processing method may be saved to <policy> resource, and the removal condition may be saved to <condition> (or <rule>) resource.

This can adopt a scheme of connecting target information and target removal policy by link in order to reuse the same policy information like <accessControlPolicy> resource of oneM2M instead of re-defining the same policy information each time.

In FIG. 13, 0 . . . n means that 0~n corresponding resources/attributes can be owned and 0 . . . 1 means that 0 or 1 corresponding resource/attribute can be owned. Moreover, L means that 1 list having a plurality of values of a value can be owned.

Figure 14:
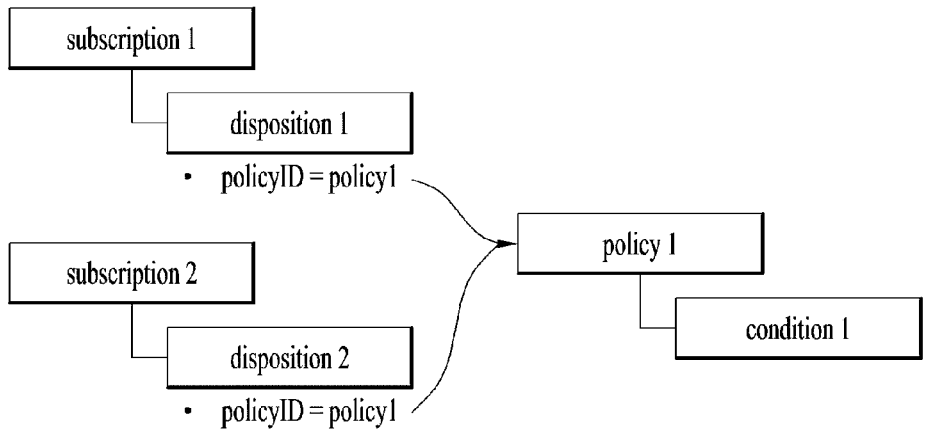
FIG. 14 shows a structure of a subscription resource according to one embodiment of the present invention.

FIG. 14 shows benefits in case of separating <policy> resource from <disposition> resource similarly to <accessControlPolicy> policy. In particular, different <disposition> resources may reuse the same <policy> resource.

Figure 15:
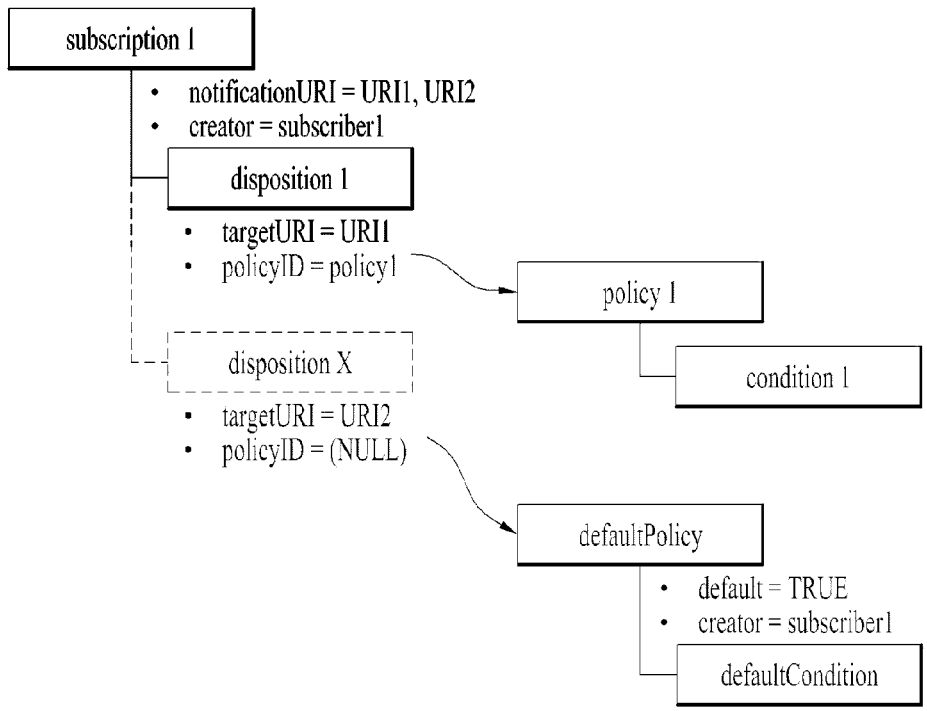
FIG. 15 shows a structure of a subscription resource according to one embodiment of the present invention.

A subscription creator can set up a processing scheme in response to a target removal request of a specific notification target by linking the <policy> resource using the <disposition> resource. Yet, like FIG. 15, a default target removal policy may apply to a notification target failing to be configured in <disposition>. In FIG. 15, a removal of a notification target of URI1 can be processed by a notifier through policy 1 resource. Yet, any policy information is not configured in URI2. Thus, in case of a target failing to have policy information configured therein, default target removal configuration information owned by a notifier can be referred to.

Figure 16:
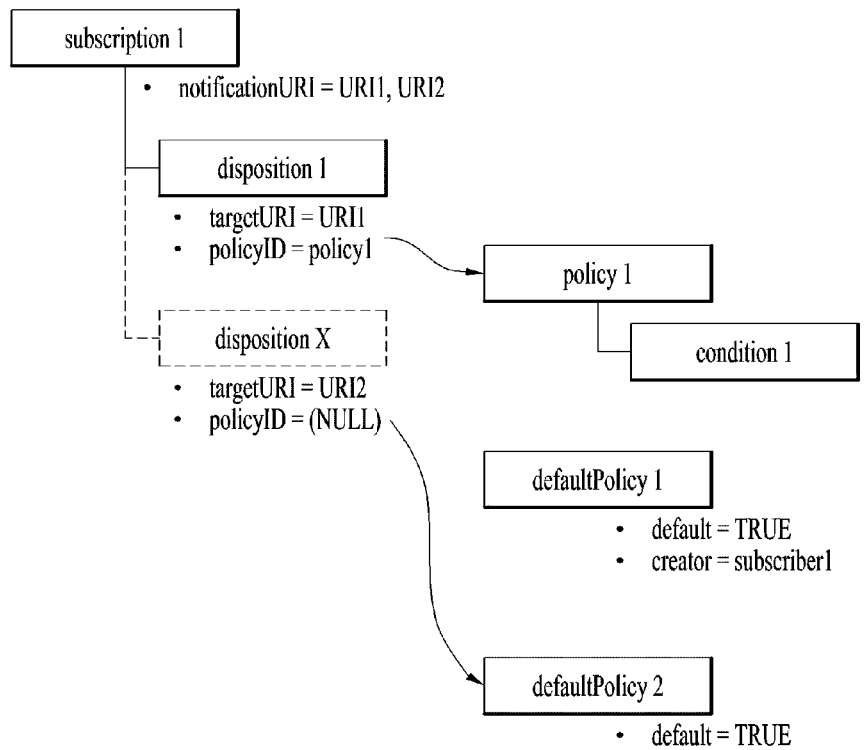
FIG. 16 shows a structure of a subscription resource according to one embodiment of the present invention.

Herein, the default target removal configuration information includes information indicating a default in <policy> resource. As shown in FIG. 16, setting a 'default' attribute to 'TRUE' is one example. The <policy> resource can save information of an entity having created a corresponding resource additionally to a 'creator' attribute.

If a removal request for a target for which policy information is not configured like URI2 is received, a notifier finds and applies a default policy resource of an entity having created a corresponding subscription. The information on the entity having created the subscription may be saved as a creator attribute of the subscription resource (e.g., <subscription> resource).

If the corresponding <subscription> resource does not include creator information or <policy> resource having identical creator information does not exist, the notifier can refer to a default policy set up by a service provider or the notifier itself.

FIG. 16 shows one example that, if creator information does not exist in subscription, a notifier refers to or applies a default policy (defaultPoilcy 2) having no creator information set therein. In this case, assume that the default policy having no creator information is regarded as a resource configured by a service provider. Hence, the default policy can include ID information of the service provider or the notifier as the creator information.

Request for Notification Target Removal

Methods for a notification target to request a notification (message) reception rejection can be mainly classified into two types. The first is a method of delivering reception rejection intention through a response message of a notification in case of a notification reception. The second is a method of delivering a reception rejection intention through a separate request irrespective of a notification reception.

Figure 17:
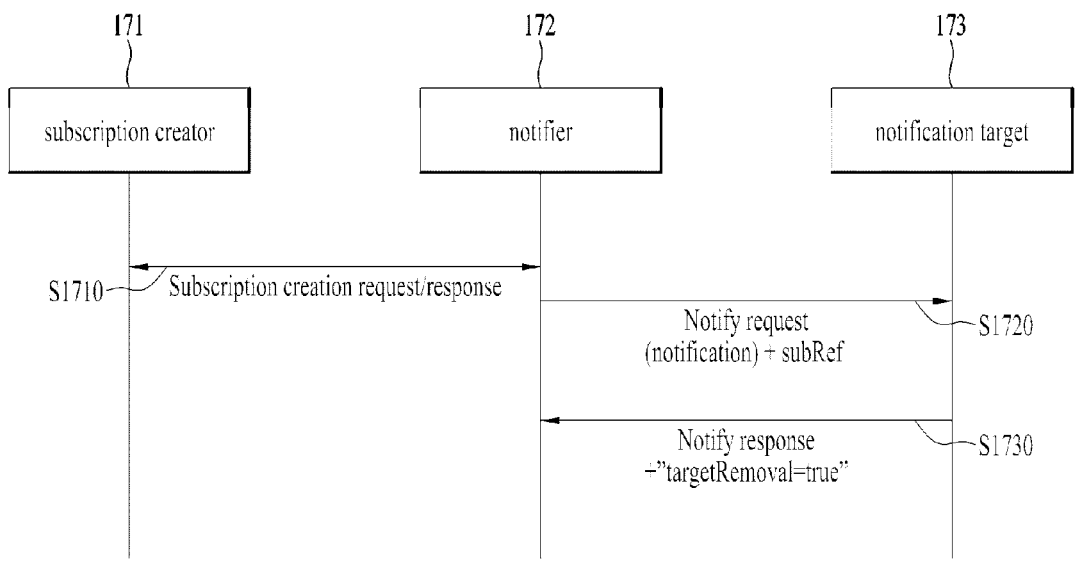
FIG. 17 shows an operation for updating a notification target list according to one embodiment of the present invention.

FIG. 17 shows a method of delivering the reception rejection intention through a response to a notification (notify request).

A subscription creator 171 exchanges request and response messages for subscription (or, subscription resource) creation with a notifier 172 [S1710], and assume that the corresponding subscription has been created correspondingly. The corresponding subscription is to send a notification message to a notification target 173. If a specific event occurs, the notifier can send a notification request to the notification target [S1720]. The notification request may include subRef, i.e., the address information of the corresponding subscription resource. Thereafter, the notification target can send a notification response to the notifier in response to the notification request [S1730]. If the notification target desires to receive the notification for the corresponding subscription no more, the notification target may send a request for removing itself from a (reception) list of the corresponding subscription in a manner of having an indicator such as 'targetRemoval=true' contained in the notification response.

In this case, in making a request for removing a notification target itself from a notification reception list of a corresponding subscription, the notification target can make a corresponding request with one removal indication information such as targetRemoval=true without separately indicating a prescribed subscription among several subscriptions owned by a prescribed notifier and a request for a change of a prescribed value in subscription configuration. This is because the notification request of S1720 in FIG. 17 already contains information such as URI for the corresponding subscription and because a targetRemoval indicator includes notificationURI attribute change of the subscription.

This method has a benefit of schematically configuring the notification response message of S1730. On the contrary, in order to deliver a reception rejection intention to a notifier, there is restriction that the notification target should receive a notification request.

Figure 18:
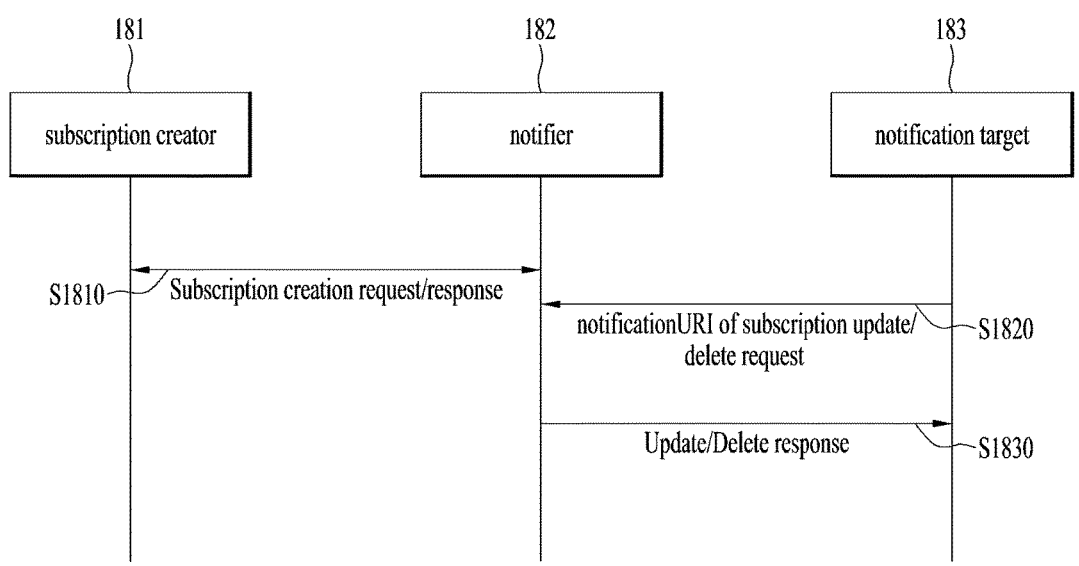
FIG. 18 shows an operation for updating a notification target list according to one embodiment of the present invention.

FIG. 18 shows a method of delivering the notification reception rejection intention to a notifier without a preceding condition of receiving a notification. In this case, no restriction is put on the notification as FIG. 17. Hence, in determining a corresponding target removal request, the notifier can check information such as a time of receiving a request indicated by the condition shown in FIG. 13 or a target location at a time/location at which a notification target desires removal. On the other hand, in case like FIG. 17, time/location information for desiring removal and time/location information for delivering a corresponding intention through a response message may vary.

The notification target 183 may send an update or delete request for deleting information corresponding to itself from notificationURI attribute of the corresponding subscription to the notifier 182. Hence, as a target of this request, a subscription resource or notificationURI attribute of the subscription resource can be directly indicated by the notification target.

For instance, Update/Delete request message can include the following information. Herein, assume that notificationURI of subscription 1 is set to URI1, URI2 and URI3 in advance. And, a notification target sending a target removal request corresponds to URI3.

<Update request message>
Operation: Update
To: CSEBase/subscription1
Content:
<notificationURI> URI1 URI2 </notificationURI>
<Delete request message>
Operation: Delete
To: CSEBase/subscription1
Content:
<notificationURI> URI3 </notificationURI>

As another benefit, the notification target may be aware of a processing result for its removal request through S1830. The notifier can send the notification target the response of S1830 in a manner that an action of a policy and a processing result by the action are included in the corresponding response.

As analysed in the problems of the related art, a notification target generally does not have an Update or Delete authority for a corresponding subscription in general. Hence, in order for the notifier to approve the request of S1820, an additional procedure can be performed as well as the authority confirmation by the existing <accessControlPolicy> resource.

In case of Update or Delete request reception for notificationURI, the notifier firstly checks authority through accessControlPollicy check. Even if determining the non-presence of authority, it is checked whether the notification target having made the corresponding request can remove itself by checking a disposition resource shown in FIG. 13 and policy and rule resources linked to the disposition resource. The authority check by the corresponding disposition/policy/rule is a process that only applies to notificationURI attribute indicating a notification target of subscription.

Method for Processing Request for Notification Target Removal

Figure 19:
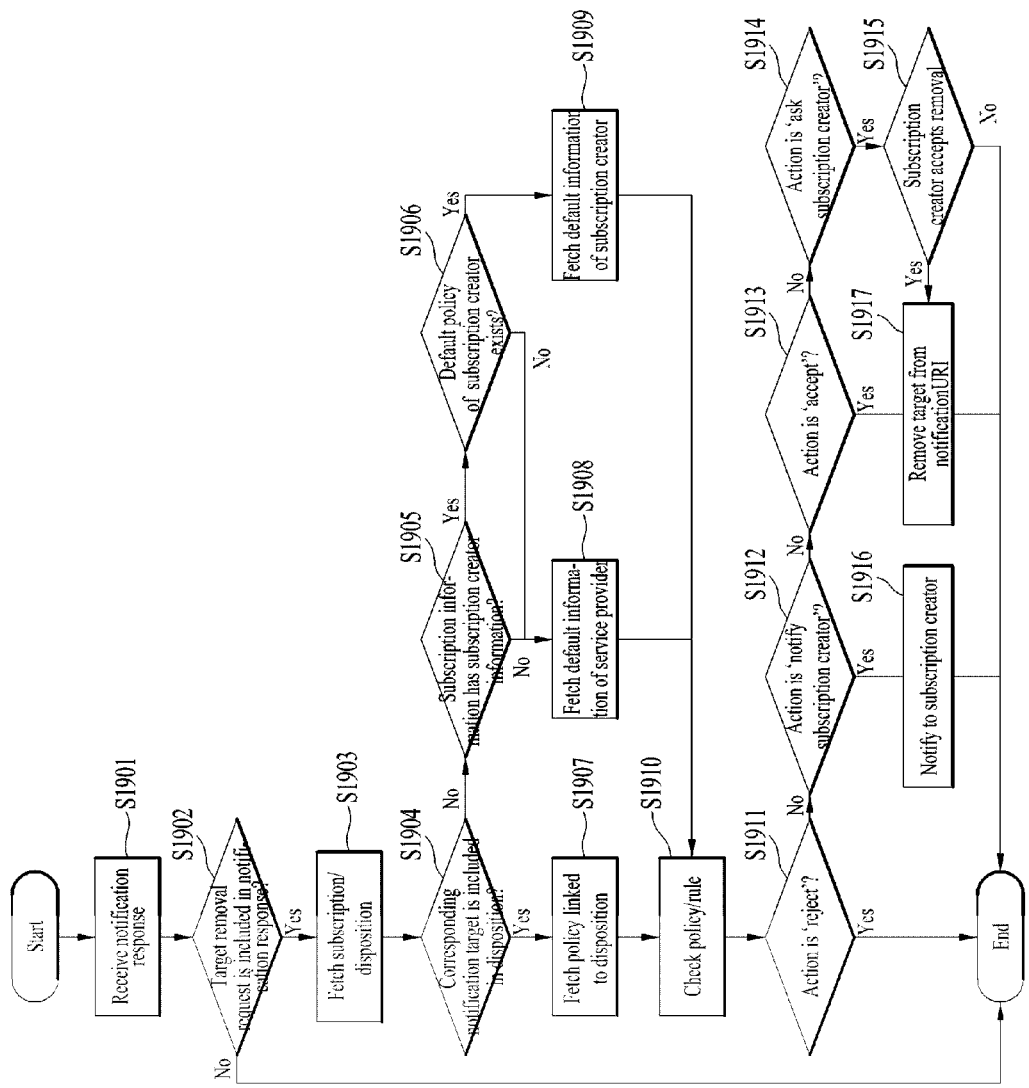
FIG. 19 shows an operation for updating a notification target list according to a detailed embodiment of the present invention.

FIG. 19 shows an action of a notifier if a target removal is requested by a notify response like FIG. 17.

A notifier can receive a notification response from a notification target [S1901]. The notifier can check whether a target removal request is included in the notification response [S1902]. If the target removal request is not included in the notification response, the corresponding action is terminated.

If the target removal request is included in the notification response, the notifier discovers notification information (i.e., corresponding subscription information) previously sent by the notifier and also discovers a disposition associated with the subscription information through the notification information [S1903].

The notifier can check whether disposition for the notification target is set [S1904]. If the disposition for the notification target is set, the notifier can fetch a policy linked to the disposition [S1907].

If the disposition for the notification target is not set, it is able to check whether a default policy preset by the creator of the subscription or whether a default policy set by the service provider exists if the basic policy does not exist are checked. To this end, the notifier may check whether subscription creator information is included in the subscription information [S1905]. If the subscription creator information is not included in the subscription information, the notifier may fetch the default policy of the service provider [S1908].

If the subscription creator information is included in the subscription information, the notifier can check whether a default policy of the corresponding subscription creator exists [S1906]. If the default policy of the corresponding subscription creator does not exist, the notifier may fetch the default policy of the subscription creator [S1909].

Thereafter, the notifier may check a policy, a default policy, a rule and the like [S1910]. If the rule (condition) exists, the notifier may check whether the rule (condition) is met and then checks action information of the corresponding policy.

Through S1911 to S1917, the notifier performs the processing for the target removal request according to the action information. Herein, the action information may have such a value for the corresponding target removal request as 'accept', 'reject', 'notify to subscription creator', or 'remove if subscription creator is asked about and accepts'. The execution order of S1911, S1912, S1913, and S1914 may be changeable. Namely, in case of checking in order of S1914, S1913, S1912 and S1911, if S1914 is determined as No, S1913 is executed. If S1914 is Yes, S1915 is executed. Yet, S1915 is executed dependently only if S1914 is Yes.

In detail, the notifier can check whether the action information is 'reject' [S1911]. If the action information is 'reject', the notifier rejects the target removal request included in the notification response and terminates the action. If the action information is not 'reject', the notifier can check whether the action information is 'notify to subscription creator' [S1912]. If the action information is 'notify to subscription creator' the notifier can inform the subscription creator that the target removal request is received [S1916]. If the action information is not 'notify to subscription creator', the notifier can check whether the action information is 'accept' [S1913]. If the action information is 'accept', the notifier can remove the notification target (i.e., URI or ID of the notification target) from notificationURI [S1917]. If the action information is not 'accept', the notifier can check whether the action information is 'remove if subscription creator is asked about and accepts' [S1914]. If the action information is 'remove if subscription creator is asked about and accepts', the notifier can check whether the subscription creator accepts the removal of the notification target [S1915]. If the subscription creator accepts the removal of the notification target, the notifier executes S1917. If the subscription creator does not accept the removal of the notification target, the corresponding procedure is terminated.

Figure 20:
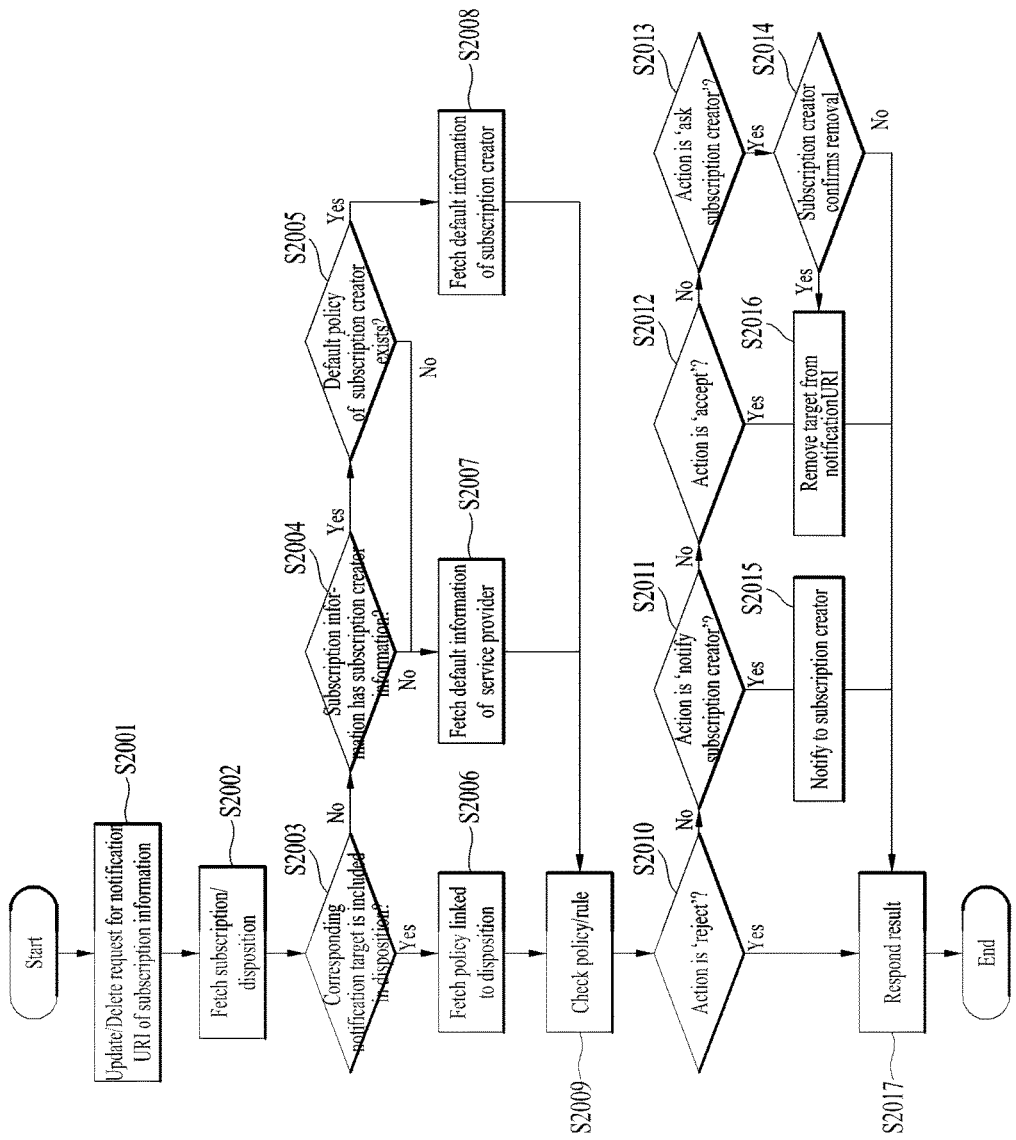
FIG. 20 shows an operation for updating a notification target list according to a detailed embodiment of the present invention.

FIG. 20 shows an action of a notifier if a target removal is requested through Update/Delete Request like FIG. 18. The rest of steps except S2001 and S2017 are equivalent to FIG. 19. Namely, S2002 to S2016 are equal to S1903 to S1917 in FIG. 19. Hence, description of S2002 to S2016 shall refer to that of FIG. 19.

In S2001, a notifier receives a request for removing a target of notificationURI of a specific subscription. In this case, additionally, in order to check that a target actually removes target information of its own, it is able to confirm that information (e.g., ID of <AE> resource) of a target included in notificationURI or information additionally obtained through the target information matches notification target information (explicitly specified in 'From' parameter of the corresponding request) having sent the update/delete request.

In S2017, the notifier can notify a target removal processing result according to the confirmed action as a response to the notification target.

Apply to <Group> Resource

Figure 21:
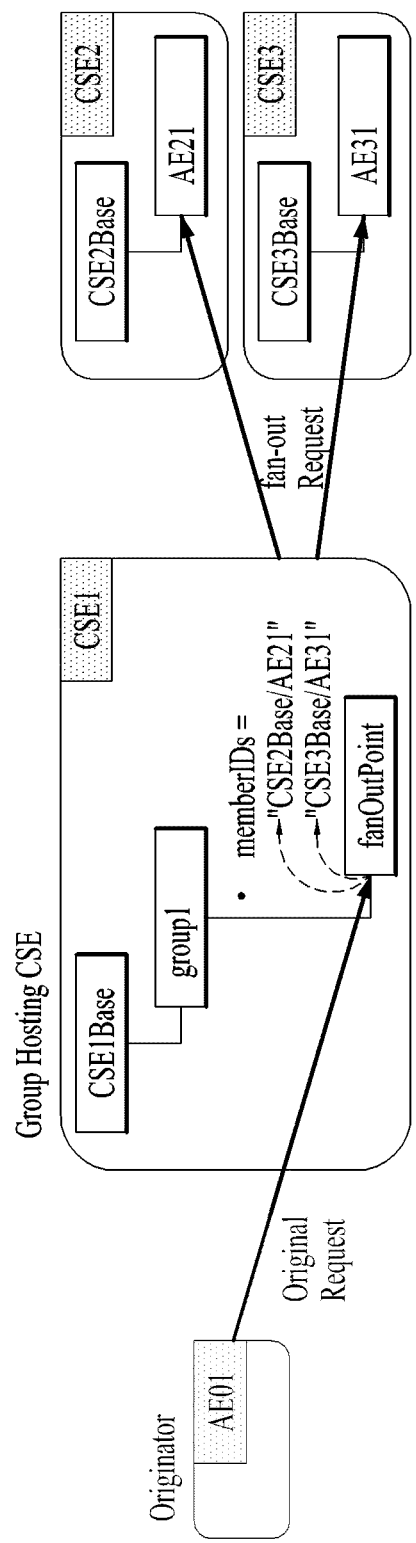
FIG. 21 shows a group member managing operation according to another embodiment of the present invention.
Figure 22:
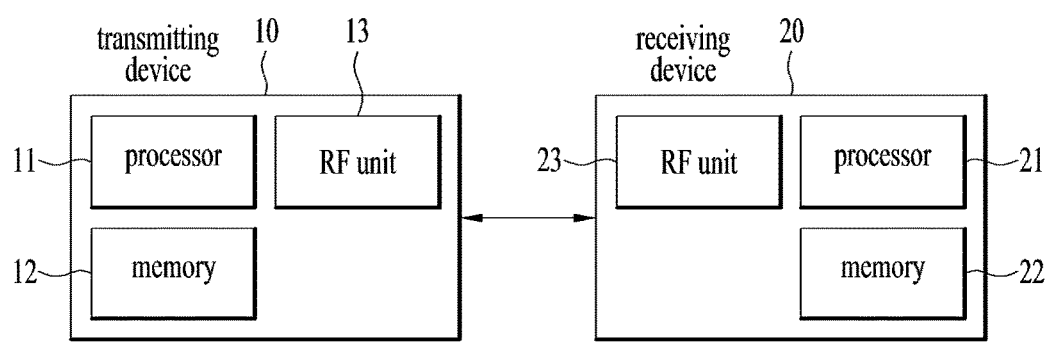
FIG. 22 is a block diagram of a device configured to implement embodiment(s) of the present invention.

<group> resource has a plurality of members (targets) similarly to <subscription> and has a process for sending a request message to a corresponding member. FIG. 21 shows an example that the <group> resource operates. Group1 has CSE2Base/AE21 and CSE3Base/AE31 as members. If receiving a specific request on fanOutPoint resource, group 1 delivers the request to the two members.

Hence, if CSE2 and CSE3 do not desire to receive a request of the corresponding group anymore, they should be able to remove IDs indicating themselves from memberIDs attribute. To this end, by leaving a disposition resource described in the present invention as a child resource of the group resource and using policy and condition (rule) resources linked to the disposition, it is able to identically support a function of enabling a member of a group to leave the group.

FIG. 15 is a block diagram of a transmitting device 10 and a receiving device 20 configured to implement exemplary embodiments of the present invention. Referring to FIG. 15, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

What is claimed is:

1. A method of processing a reception stop request of a notification according to a notification subscription in a wireless communication system, the method performed by a first device, the method comprising:
receiving, by the first device, a request for stopping a reception of the notification from a second device according to the notification subscription;
selecting, by the first device, a policy for processing the request; and
processing, by the first device, the request according to action information of the selected policy,
wherein the policy selecting comprises checking whether a first policy for target removal for the second device is set and selecting the first policy when the first policy is set,
wherein when the first policy is not set, the policy selecting comprises checking whether a second policy set by a creator device of the notification subscription exists and selecting the second policy when the second policy exists; or when the first policy is not set and the second policy set by the creator device of the notification subscription does not exist, the policy selecting comprises selecting a third policy set by a service provider, and wherein the second policy includes a policy specified by a first predetermined policy resource including information indicating 'default', and including a 'creator' attribute including information on the creator device of the notification subscription.

2. The method of claim 1, further comprising determining whether the second device is included in targets of the notification subscription.

3. The method of claim 1, wherein the checking whether the first policy for the target removal for the second device is set comprises referring to a specific resource including a uniform resource identifier (URI) of the second device and a policy resource linked to the specific resource.

4. The method of claim 3, wherein a policy indicated by the linked policy resource is selected as the first policy.

5. The method of claim 1, wherein the third policy includes a policy specified by a second predetermined policy resource including information indicating 'default'.

6. An apparatus for processing a stop request of a reception of a notification according to a notification subscription in a wireless communication system, the apparatus comprising:
a transceiver; and
a processor configured to control the transceiver,
wherein the processor is further configured to receive a request for stopping a reception of the notification from a second device according to the notification subscription, select a policy for processing the request, and process the request according to action information of the selected policy,
wherein in selecting the policy, the processor is further configured to check whether a policy for target removal for the second device is set and select the policy for the target removal for the second device when the policy for the target removal for the second device is set,
wherein when the policy for target removal for the second device is not set, the processor is further configured to check whether a default policy set by a creator device of the notification subscription exists and select the default policy set by the creator device when the default policy set by the creator device of the notification subscription exists; or when the policy for the target removal for the second device is not set and the default policy set by the creator device of the notification subscription does not exist, the processor is further configured to select a default policy set by a service provider, and
wherein the second policy includes a policy specified by a first predetermined policy resource including information indicating 'default', and including a 'creator' attribute including information on the creator device of the notification subscription.

7. The apparatus of claim 6, wherein the processor determines whether the second device is included in targets of the notification subscription.

8. The apparatus of claim 6, wherein in checking whether the policy for the target removal for the second device is set, the processor refers to a specific resource including a uniform resource identifier (URI) of the second device and a policy resource linked to the specific resource.

9. The apparatus of claim 8, wherein a policy indicated by the linked policy resource is selected as the first policy.

10. The apparatus of claim 6, wherein the third policy includes a policy specified by a second predetermined policy resource including information indicating 'default'.

* * * * *